US010412707B2

(12) United States Patent
Sorrentino et al.

(10) Patent No.: US 10,412,707 B2
(45) Date of Patent: Sep. 10, 2019

(54) RESOURCE POOLS FOR VEHICULAR COMMUNICATIONS

(71) Applicant: Telefonaktiebolaget LM Ericsson (publ), Stockholm (SE)

(72) Inventors: Stefano Sorrentino, Solna (SE); Hieu Do, Järfälla (SE); Qianxi Lu, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/575,754

(22) PCT Filed: Jun. 2, 2016

(86) PCT No.: PCT/SE2016/050517
§ 371 (c)(1),
(2) Date: Nov. 20, 2017

(87) PCT Pub. No.: WO2016/195582
PCT Pub. Date: Dec. 8, 2016

(65) Prior Publication Data
US 2018/0115960 A1    Apr. 26, 2018

Related U.S. Application Data
(60) Provisional application No. 62/170,006, filed on Jun. 2, 2015.

(51) Int. Cl.
H04W 72/02        (2009.01)
H04W 72/04        (2009.01)
(Continued)

(52) U.S. Cl.
CPC ............. *H04W 72/02* (2013.01); *H04L 67/12* (2013.01); *H04W 72/042* (2013.01); *H04W 92/18* (2013.01)

(58) Field of Classification Search
CPC ... H04W 72/02; H04W 72/042; H04W 76/14; H04W 4/70; H04L 67/12; H04L 67/104
See application file for complete search history.

(56) References Cited

U.S. PATENT DOCUMENTS 9,215,693 B2 *   12/2015  Ahn .................... H04W 72/04
10,085,298 B2 *   9/2018  Jung ................... H04W 76/14
(Continued)

FOREIGN PATENT DOCUMENTS

WO    2015 046972 A1    4/2015
WO    2015 065881 A1    5/2015

OTHER PUBLICATIONS

PCT International Search Report for International application No. PCT/SE2016/050517—dated Aug. 18, 2016.
(Continued)

*Primary Examiner* — Shukri Taha
(74) *Attorney, Agent, or Firm* — Patent Portfolio Builders, PLLC

(57) ABSTRACT

According to some embodiments, a method of device-to-device (D2D) communication comprises obtaining a division of radio resources. The division of radio resources comprises a first plurality of pools of a first periodicity. Each of the first plurality of pools comprises a set of radio resources and a plurality of patterns spanning the set of radio resources. The division of radio resources also comprises a division of the first plurality of pools into a second plurality of pools of a second periodicity greater than the first periodicity. Each of the second plurality of pools comprises a plurality of patterns comprising a union of the plurality of patterns of each pool of the first plurality pools that are included within the pool of the second plurality of pools. The (Continued)

method further comprises determining a pattern from one of the first or second plurality of pools, and using it to transmit the message.

30 Claims, 15 Drawing Sheets

(51) Int. Cl.
*H04L 29/08* (2006.01)
*H04W 92/18* (2009.01)

(56) References Cited

U.S. PATENT DOCUMENTS

| | | | |
|---|---|---|---|
| 2016/0205717 A1* | 7/2016 | Kazmi | H04W 8/005 |
| | | | 455/435.2 |
| 2017/0303240 A1* | 10/2017 | Basu Mallick | H04W 72/04 |
| 2018/0227932 A1* | 8/2018 | Chatterjee | H04W 76/18 |

OTHER PUBLICATIONS

3GPP TSG RAN WG1 Meeting #76; Prague, Czech Republic; Source: Intel Corporation; Title: Discussion on D2D broadcast resource allocation (R1-140130)—Feb. 10-14, 2014.

PCT Written Opinion of the International Searching Authority International application No. PCT/SE2016/050517—dated Feb. 10-14, 2014.

\* cited by examiner

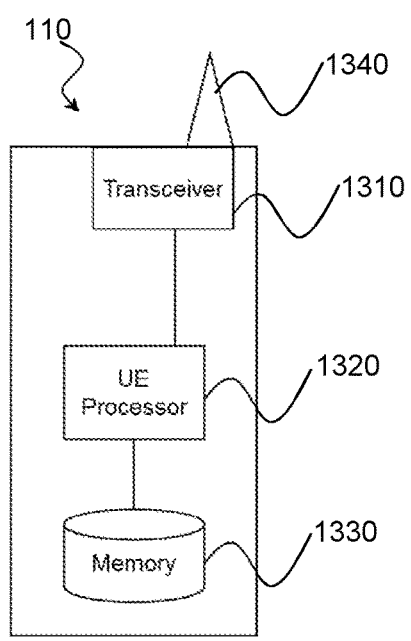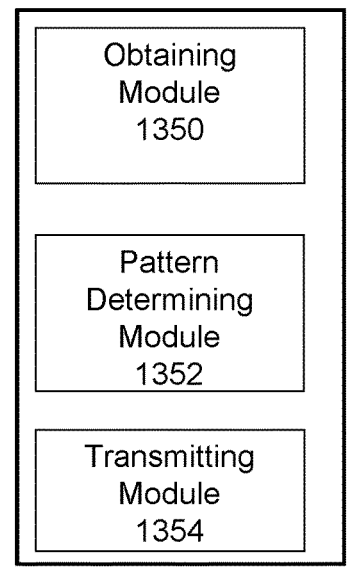
FIG. 13A                     FIG. 13B

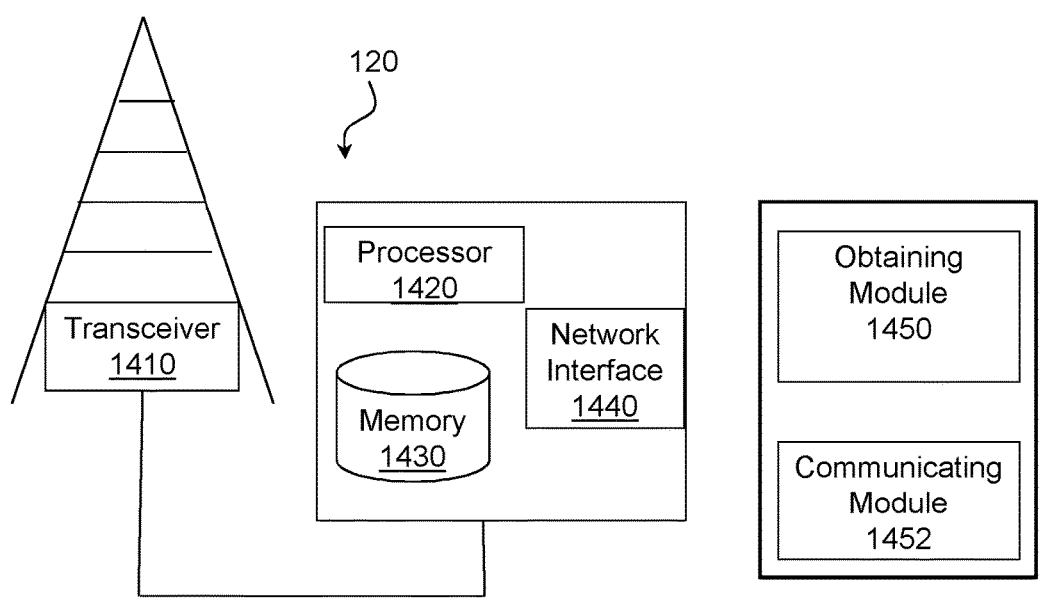
FIG. 14A                    FIG. 14B

RESOURCE POOLS FOR VEHICULAR COMMUNICATIONS

PRIORITY

This nonprovisional application is a U.S. National Stage Filing under 35 U.S.C. § 371 of International Patent Application Serial No. PCT/SE2016/050517 filed Jun. 2, 2016, and entitled "RESOURCE POOLS FOR VEHICULAR COMMUNICATIONS" which claims priority to U.S. Provisional Patent Application No. 62/170,006 filed Jun. 2, 2015, both of which are hereby incorporated by reference in their entirety.

TECHNICAL FIELD

Particular embodiments relate generally to wireless communications networks, and more particularly to resource pool configuration for device-to-device (D2D) communications, such as direct vehicular communications.

BACKGROUND

Device-to-device (D2D) communication is a well-known and widely used component of many existing wireless technologies, including ad hoc and cellular networks. Examples include Bluetooth and several variants of the IEEE 802.11 standards suite, such as WiFi Direct. These systems operate in unlicensed spectrum. The Third Generation Partnership Project (3GPP) Long Term Evolution (LTE) specifications refer to D2D communications as sidelink communications.

D2D features include both commercial and public safety applications. Some applications include device discovery, where devices are able to sense the proximity of another device and associated application by broadcasting and detecting discovery messages that carry device and application identities. Another application involves direct communication based on physical channels terminated directly between devices.

Another D2D application includes V2x communication, which refers to any combination of direct communication between vehicles, pedestrians and infrastructure. V2x communication may take advantage of a network infrastructure, when available. Even when out-of-coverage, basic V2x connectivity is possible. An LTE-based V2x interface may be economically advantageous because of the LTE economies of scale and it may enable tighter integration between communications with the network infrastructure (V2I) and vehicle-to-person (V2P) and vehicle-to-vehicle (V2V) communications, as compared to a dedicated V2x technology.

FIG. 1 is a block diagram illustrating an example LTE V2x network. Wireless devices 210 may communicate with a network node 220 using wireless signals 230. Wireless devices 210 may communicate with other wireless devices 210 using wireless signals 240. Wireless devices 210 may include handsets and vehicles, such as passenger cars, trucks, and busses equipped with wireless transceivers.

V2x communications may include both safety and non-safety information. Each type of information may be associated with applications and services that have specific requirements, for example, in terms of latency, reliability, capacity, etc.

ETSI has defined two types of messages for road safety. The two types are Co-operative Awareness Message (CAM) and Decentralized Environmental Notification Message (DENM).

CAM messages enable vehicles, including emergency vehicles, to notify their presence and other relevant parameters via a broadcast. Such messages target other vehicles, pedestrians, and infrastructure, and are handled by their applications. CAM messages also provide active driving safety assistance for normal, non-emergency traffic. A wireless device may check for the availability of a CAM message every 100 ms, yielding a maximum detection latency requirement of less than or equal to 100 ms for most messages. The latency requirement for a pre-crash sensing warning, however, is 50 ms.

DENM messages are event-triggered, such as by braking. A wireless device may also check for the availability of a DENM message every 100 ms. The maximum latency requirement is less than or equal to 100 ms.

The size of CAM and DENM messages may vary from 100+ to 800+ bytes. A typical size is around 300 bytes. The messages are supposed to be detected by all vehicles in proximity. The Society of the Automotive Engineers (SAE) also defines a standard message referred to as the Basic Safety Message (BSM) for dedicated short-range communications (DSRC). BSM defines various message sizes. BSMs may be classified into different priorities based on the importance and urgency of the messages.

When a D2D interface is used for direct communication between wireless devices, particularly for vehicular applications, multiple transmission formats, resource allocation methods, and transmission periodicities need to be accommodated on the same carrier. One way to provide this, according to the principles of LTE D2D in Rel-12, is to define multiple pools each associated to specific transmission format and resource allocation parameters. A problem with this solution, however, is that such pools may use orthogonal radio resources to reduce interference, which causes serious resource fragmentation for the carrier. This degrades radio utilization efficiency.

SUMMARY

The embodiments described herein include resource pools for device-to-device (D2D) communication that define resource patterns for a set of basic resource pools, and the set of basic resource pools are aggregated or nested in such a way that replicates and aggregates the resource patterns defined for each of the basic pools. Particular embodiments may use the nested pool structure to maximize efficiency while accommodating both aperiodic radio transmissions and radio transmissions with various periodicities. In particular embodiments, periodic transmissions may use resource patterns belonging to pools with an aggregation level corresponding to the periodicity of the transmission. Aperiodic transmissions may use the first suitable pattern at the lowest aggregation level. Particular embodiments also include methods of signalling resource patterns, randomizing resources, enabling distributed resource allocation, and aggregating the patterns.

According to some embodiments, a method of device-to-device (D2D) communication comprises obtaining a division of radio resources. The division of radio resources comprises a first plurality of pools of a first periodicity. Each of the first plurality of pools comprises a set of radio resources and a plurality of patterns spanning the set of radio resources. The division of radio resources also comprises a division of the first plurality of pools into a second plurality of pools of a second periodicity greater than the first periodicity. Each of the second plurality of pools comprises a plurality of patterns comprising a union of the plurality of patterns of each pool of the first plurality pools that are included within the pool of the second plurality of pools. The method further comprises determining a pattern from one of the first or second plurality of pools, and using it to transmit the message. The message may comprise a vehicular communication message.

In particular embodiments, if the message is periodic, then determining the pattern for transmitting the message comprises determining the pattern based on a periodicity of the message and at least one of the first periodicity associated with the first plurality of pools and the second periodicity associated with the second plurality of pools. If the message is aperiodic, then determining the pattern for transmitting the message comprises determining a pattern from a pool of the first plurality of pools.

In particular embodiments, the method further comprises determining a retransmission pattern for retransmission of the message. The determined retransmission pattern may be from the same plurality of pools as the determined pattern, or the determined retransmission pattern may be from the same pool as the determined pattern.

Particular embodiments may signal, to the second wireless device, information about the pool from which the determined pattern belongs. In particular embodiments, the plurality of patterns of a pool of the first plurality of pools comprise identical lengths and number of radio resources. Each pool of the first plurality of pools may comprise the same plurality of patterns. A set of resources spanned by a pattern of the plurality of patterns may vary across pools according to a hopping pattern.

In particular embodiments, obtaining the division of the set of radio resources allocated for D2D communication may comprise receiving the division from a network node, or may comprise the wireless device being preconfigured with the division.

According to some embodiments, a method of D2D communication in a wireless communication network comprises obtaining, by a network node, a division of radio resources allocated for D2D communication. The division of the radio resources comprises a first plurality of pools associated with a first periodicity. Each pool of the first plurality of pools comprises a set of radio resources. The set of radio resources comprises a subset of the radio resources allocated for D2D communication. Each pool of the first plurality of pools further comprises a plurality of patterns spanning the set of radio resources. The division of the radio resources further comprises a division of the first plurality of pools into a second plurality of pools associated with a second periodicity greater than the first periodicity. Each pool of the second plurality of pools comprises a plurality of patterns comprising a union of the plurality of patterns spanning the radio resources of each pool of the first plurality pools that are included within the pool of the second plurality of pools. The method further comprises communicating information about the first plurality of pools and second plurality of pools to a wireless device.

In particular embodiments, the plurality of patterns of a pool of the first plurality of pools comprise identical lengths and number of radio resources. A set of resources spanned by a pattern of the plurality of patterns may vary across pools of the first plurality of pools according to a hopping pattern.

According to some embodiments, a wireless device comprises a memory coupled to a processor. The processor is operable to obtain a division of radio resources allocated for D2D communication. The division of the radio resources comprises a first plurality of pools associated with a first periodicity. Each pool of the first plurality of pools comprises a set of radio resources. The set of radio resources comprises a subset of the radio resources allocated for D2D communication. Each pool of the first plurality of pools further comprises a plurality of patterns spanning the set of radio resources. The division of radio resources further comprises a division of the first plurality of pools into a second plurality of pools associated with a second periodicity greater than the first periodicity. Each pool of the second plurality of pools comprises a plurality of patterns comprising a union of the plurality of patterns spanning the radio resources of each pool of the first plurality pools that are included within the pool of the second plurality of pools. The processor is further operable to determine a pattern from one of the first plurality of pools or the second plurality of pools for transmitting a message; and transmit the message to another wireless device using the determined pattern.

According to some embodiments, a network node comprises a memory coupled to a processor. The processor is operable to obtain a division of radio resources allocated for D2D communication. The division of the radio resources comprises a first plurality of pools associated with a first periodicity. Each pool of the first plurality of pools comprises a set of radio resources. The set of radio resources comprises a subset of the radio resources allocated for D2D communication. Each pool of the first plurality of pools further comprises a plurality of patterns spanning the set of radio resources. The division of radio resources further comprises a division of the first plurality of pools into a second plurality of pools associated with a second periodicity greater than the first periodicity. Each pool of the second plurality of pools comprises a plurality of patterns comprising a union of the plurality of patterns spanning the radio resources of each pool of the first plurality pools that are included within the pool of the second plurality of pools. The processor is further operable to communicate information about the first plurality of pools and second plurality of pools to a wireless device.

According to some embodiments, a wireless device comprises an obtaining module, a pattern determining module, and a transmitting module. The obtaining module is operable to obtain a division of radio resources allocated for D2D communication. The division of the radio resources comprises a first plurality of pools associated with a first periodicity. Each pool of the first plurality of pools comprises a set of radio resources. The set of radio resources comprises a subset of the radio resources allocated for D2D communication. Each pool of the first plurality of pools further comprises a plurality of patterns spanning the set of radio resources. The division of radio resources further comprises a division of the first plurality of pools into a second plurality of pools associated with a second periodicity greater than the first periodicity. Each pool of the second plurality of pools comprises a plurality of patterns comprising a union of the plurality of patterns spanning the radio resources of each pool of the first plurality pools that are included within the pool of the second plurality of pools. The pattern determining module is operable to determine a pattern from one of the first plurality of pools or the second plurality of pools for transmitting a message. The transmitting module is operable to transmit the message to another wireless device using the determined pattern.

According to some embodiments, a network node comprises an obtaining module and a communicating module. The obtaining module is operable to obtain a division of radio resources allocated for D2D communication. The division of the radio resources comprises a first plurality of pools associated with a first periodicity. Each pool of the first plurality of pools comprises a set of radio resources. The set of radio resources comprises a subset of the radio resources allocated for D2D communication. Each pool of the first plurality of pools further comprises a plurality of patterns spanning the set of radio resources. The division of radio resources further comprises a division of the first plurality of pools into a second plurality of pools associated with a second periodicity greater than the first periodicity. Each pool of the second plurality of pools comprises a plurality of patterns comprising a union of the plurality of patterns spanning the radio resources of each pool of the first plurality pools that are included within the pool of the second plurality of pools. The pattern determining module is operable to determine a pattern from one of the first plurality of pools or the second plurality of pools for transmitting a message. The communicating module is operable to communicate information about the first plurality of pools and second plurality of pools to a wireless device.

Also disclosed is a computer program product. The computer program product comprises instructions stored on non-transient computer-readable media which, when executed by a processor, performs the act of obtaining a division of radio resources. The division of radio resources comprises a first plurality of pools of a first periodicity. Each of the first plurality of pools comprises a set of radio resources and a plurality of patterns spanning the set of radio resources. The division of radio resources also comprises a division of the first plurality of pools into a second plurality of pools of a second periodicity greater than the first periodicity. Each of the second plurality of pools comprises a plurality of patterns comprising a union of the plurality of patterns of each pool of the first plurality pools that are included within the pool of the second plurality of pools. The instructions, when executed by the processor, further perform the acts of determining a pattern from one of the first or second plurality of pools, and using it to transmit the message.

Another computer program product comprises instructions stored on non-transient computer-readable media which, when executed by a processor, performs the act of obtaining a division of radio resources. The division of radio resources comprises a first plurality of pools of a first periodicity. Each of the first plurality of pools comprises a set of radio resources and a plurality of patterns spanning the set of radio resources. The division of radio resources also comprises a division of the first plurality of pools into a second plurality of pools of a second periodicity greater than the first periodicity. Each of the second plurality of pools comprises a plurality of patterns comprising a union of the plurality of patterns of each pool of the first plurality pools that are included within the pool of the second plurality of pools. The instructions, when executed by the processor, further perform the acts of communicating information about the first plurality of pools and second plurality of pools to a wireless device.

Particular embodiments may exhibit some of the following technical advantages. In particular embodiments, nested or aggregated resource pools are spectrally more efficient than resource pools dedicated to particular transmission formats or periodicities. Particular embodiments provide simplicity from a signaling and implementation perspective, which may reduce network device maintenance and development costs. Other technical advantages will be readily apparent to one skilled in the art from the following figures, description and claims.

BRIEF DESCRIPTION OF THE DRAWINGS

For a more complete understanding of the embodiments and their features and advantages, reference is now made to the following description, taken in conjunction with the accompanying drawings, in which:

FIG. 13A is a block diagram illustrating an example embodiment of a wireless device;

FIG. 13B is a block diagram illustrating example components of a wireless device;

FIG. 14A is a block diagram illustrating an example embodiment of a network node;

FIG. 14B is a block diagram illustrating example components of a network node.

DETAILED DESCRIPTION

Figure 1:
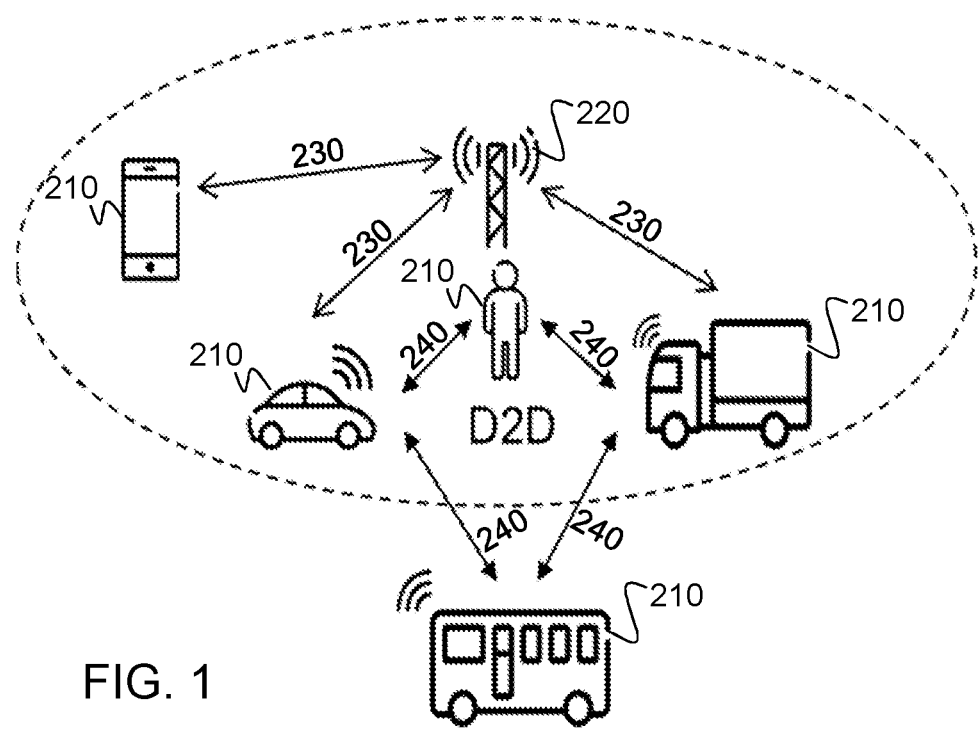
FIG. 1 is a block diagram illustrating an example LTE V2x network.

A device-to-device (D2D) interface used for direct communication between wireless devices, particularly for vehicular applications, may use multiple transmission formats, resource allocation methods, and transmission periodicities on the same carrier. Conventional resource allocation methods are inefficient for these applications because they typically define multiple pools each associated with a particular transmission format and resource allocation parameters. A problem with these solutions is that they may cause serious resource fragmentation for the carrier, which degrades radio utilization efficiency.

Particular embodiments obviate the problems described above and include resource pools for D2D communication that include resource patterns for a set of basic resource pools, and the set of basic resource pools are aggregated or nested in such a way that replicates and aggregates the resource patterns defined for each of the basic pools. Particular embodiments may use the nested pool structure to maximize efficiency while accommodating both aperiodic radio transmissions and radio transmissions with various periodicities. In particular embodiments, periodic transmissions may use resource patterns belonging to pools with an aggregation level corresponding to the periodicity of the transmission. Aperiodic transmissions may use the first suitable pattern at the lowest aggregation level. Particular embodiments also include methods of signalling resource patterns, randomizing resources, enabling distributed resource allocation, and aggregating the patterns.

A particular advantage of these embodiments is that the nested or aggregated resource pools described herein are spectrally more efficient than resource pools dedicated to particular transmission formats or periodicities. Particular embodiments provide simplicity from a signaling and implementation perspective, which may reduce device maintenance and development costs.

V2x communication systems provide service to wireless devices that are both in and out of coverage. For the latter case, at least, radio resources may be allocated to the different wireless devices without the help of a network node. The radio resource allocation, at least to some extent, may be decentralized. Particular goals of allocating resources in a decentralized manner include: 1) using resources efficiently; 2) minimizing and not repeating transmission collisions between wireless devices; and 3) providing time and/or frequency diversity.

One approach to the distributed resource allocation problem is to use patterns. For each transmission, a wireless device chooses radio resources according to some resource pattern. Such patterns may be designed to minimize the probability that pairs of wireless devices consistently miss the transmissions of the other (e.g., due to half-duplex constraints, consistent interference, etc.). A pattern may be associated to a unique pattern index.

Typically, a resource pattern includes (re)transmissions of a given message provided by higher layers. Based on knowledge of the resources spanned by a specific pattern, a receiver is able to appropriately combine (re)transmissions of a given message. In particular embodiments, patterns may span multiple messages, depending on how they are defined. LTE-based D2D (also referred to as sidelink) defines different patterns for different physical channels, such as PSCCH (control channel), PSDCH (discovery channel) and PSSCH (shared data channel). These patterns are usually designed under the assumption that the different UEs transmit packets with similar characteristics. For example, it is usually assumed that all the UEs transmit with the same periodicity or that all the packets occupy the same amount of radio resources.

Sets of patterns span a resource pool. A resource pool may comprise a set of radio resources, and all patterns belonging to a certain pool span resources within such pool. In LTE-based D2D, different pools are defined for different physical channels and resource allocation methods. However, for each of such combinations of physical channel and resource allocation method, only one single pool duration may be configured at a given time. Since pools are typically periodic in time, the pool periodicity and pool duration may be set coherently. For example, for PSDCH the pool periodicity may be as large as 1.024 s while each pool duration is limited to at most a few hundred milliseconds. Each pattern only spans the resources belonging to the pool.

Patterns are usually designed with benign radio properties with respect to some optimization goal (e.g., half duplex constraints, near-far issues, hidden nodes, etc.). Patterns that show such beneficial properties are typically all the same length and periodicity, and use same amount of radio resources. When patterns with different length, resource utilization, or periodicity are multiplexed within the same pool, some of the good properties may be degraded for some of the patterns, or the pattern design may become quite cumbersome and difficult to define and signal. Accordingly, in LTE all patterns within a given pool typically have identical radio properties in terms of length, resource utilization, and periodicity. In the simplest case, a pattern may consist of a single time/frequency resource.

For V2x applications, wireless devices capable of transmitting different types of messages may transmit with different periodicities. For example, a wireless device may transmit periodic V2V messages every 100 ms, whereas the wireless device may only transmit periodic V2P messages every few seconds. Furthermore, it is useful to apply different resource allocation methods and different radio resource utilization (e.g., bandwidth, number of retransmissions, length, etc.) for the pattern used by a given wireless device depending on the application and radio conditions.

A conventional solution defines multiple patterns that preserve the LTE Rel-12 principle that all patterns within a pool share similar radio characteristics. To apply single-periodicity patterns in this this situation, it may be necessary to split the resources into several groups, each of them for a different periodicity. However, unless the groups are re-dimensioned quite often, this solution may be inefficient, because some groups may be underutilized while some groups may be congested. Also, this solution results in resource fragmentation which is usually inefficient from system efficiency perspective.

The embodiments described herein may construct patterns for several periodicities and other properties in a way that enables them to coexist within common pools without degrading the radio performance. In addition, some embodiments extend simple patterns to a large number of periodicities, which may be advantageous in terms of complexity, signalling overhead, and memory.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

The embodiments described herein may apply to LTE or to any other wireless systems, including 5G standards.

While certain embodiments are described in terms of V2x applications, they can also be used for other type of communications with decentralized resource allocation such as D2D communication.

Particular embodiments are described with reference to FIGS. 2-14B of the drawings, like numerals being used for like and corresponding parts of the various drawings. LTE is used throughout this disclosure as an example cellular system, but the ideas presented herein may apply to other wireless communication systems as well.

Figure 2:
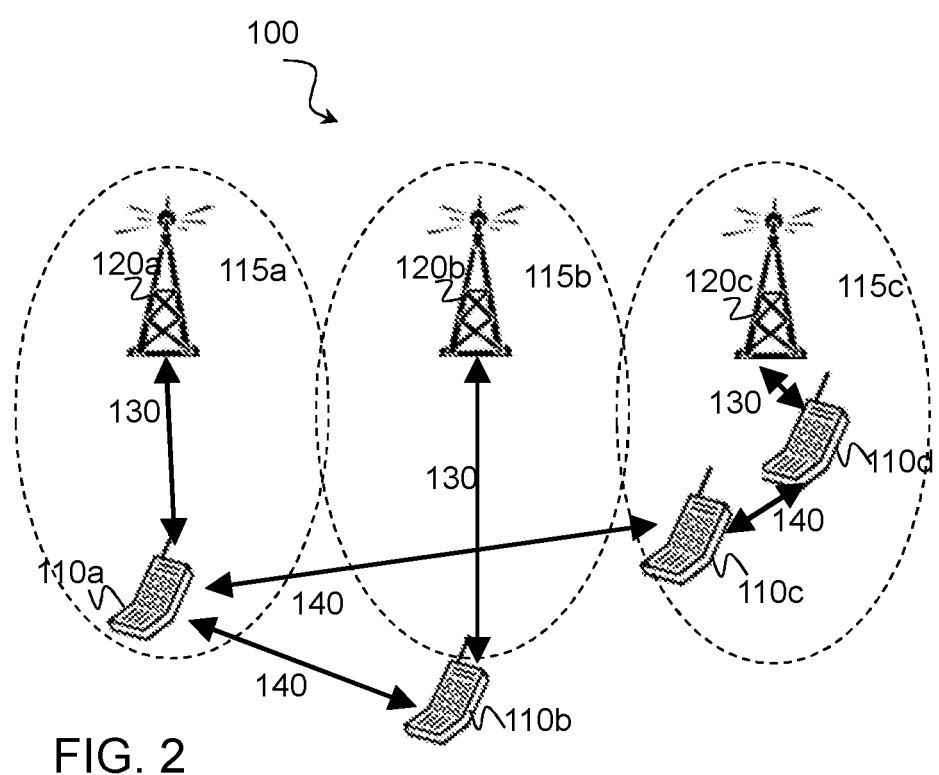
FIG. 2 is a block diagram illustrating an example wireless network, according to a particular embodiment.

FIG. 2 is a block diagram illustrating an example wireless network, according to a particular embodiment. Wireless network 100 includes one or more wireless devices 110 (such as mobile phones, smart phones, laptop computers, tablet computers, MTC devices, vehicles, or any other devices that can provide wireless communication) and a plurality of network nodes 120 (such as base stations or eNodeBs). Wireless device 110 may also be referred to as a UE. Radio network node 120 serves coverage area 115 (also referred to as cell 115).

In general, wireless devices 110 that are within coverage of radio network node 120 (e.g., within cell 115 served by network node 120) communicate with radio network node 120 by transmitting and receiving wireless signals 130. For example, wireless devices 110 and radio network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from radio network node 120 to wireless devices 110) and uplink transmissions (from wireless devices 110 to radio network node 120).

Each network node 120 may have a single transmitter or multiple transmitters for transmitting signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120 or other wireless devices 110.

Similar to wireless devices 210 and wireless signals 240 described with respect to FIG. 1, wireless devices 110 may communicate with each other (i.e., D2D operation) by transmitting and receiving wireless signals 140. For example, wireless device 110a may communicate with wireless device 110b using wireless signal 140. Wireless signal 140 may also be referred to as sidelink 140. Communication between two wireless devices 110 may be referred to as D2D communication or sidelink communication. In particular embodiments, wireless signal 140 may use a different carrier frequency than the carrier frequency of wireless signal 130. For example, wireless device 110a may communicate with network node 120a using a first frequency band and may communicate with wireless device 110b using the same frequency band or a second frequency band. Wireless devices 110a and 110b may be served by the same network node 120 or by different network nodes 120. In particular embodiments, one or both of network nodes 110a and 110b may be out-of-coverage of any network node 120.

In particular embodiments, wireless devices 110 may communicate with each other using particular time and frequency resources. The time and frequency resources are shared among both the D2D communications (i.e., between wireless devices 110) and the cellular communications (i.e., between wireless device 110 and network node 120). For example, particular embodiments may reserve some of the cellular uplink resources for D2D communication.

In particular embodiments, D2D time and frequency resources may include pooled resources. For example, particular embodiments may define a number of basic pools available for sending data transmissions. Particular embodiments may aggregate the basic pools into higher level pools. For example, wireless device 110 may allocate a plurality of basic pools of radio resources for communication by a plurality of wireless devices 110. Wireless device 110 may aggregate one or more pools to form larger pools. Wireless device 110 may define a set of patterns for the basic pools. The patterns in the aggregated pools may comprise a union of all patterns spanned by the pools aggregated to form the aggregated pools.

To transmit data, wireless device 110 may use one or more resources (e.g., time and/or frequency resources) from one of the D2D resource pools. For example, wireless device 110 may determine whether transmission of a message is periodic or aperiodic. If the transmission is periodic, wireless device 110 may transmit the message by selecting a pattern from a pool where the pool aggregation level is a function of the periodicity of the message. The different pools of radio resources may be used for transmissions with different periodicities. If the transmission is aperiodic, wireless device 110 may transmit the message using the first available pool of resources with the smallest aggregation level.

When wireless device 110 is in communication with network node 120, wireless device 110 may receive one or more pool configurations from network node 120. When wireless device 110 is out-of-coverage, for example, wireless device 110 may rely on preconfigured D2D pools.

For example, network node 120 may obtain a division of radio resources allocated for D2D communication into a first plurality of pools. Each pool of the first plurality of pools may be associated with a first periodicity. A plurality of resource patterns span the radio resources of a pool of the first plurality of pools. Each pool of the first plurality of pools may include the same plurality of patterns. Network node 120 may obtain a division of the first plurality of pools into a second plurality of pools. Each pool of the second plurality of pools is associated with a second periodicity greater than the first periodicity. A plurality of patterns spanning the radio resources of a pool of the second plurality of pools comprises a union of the plurality of patterns spanning the radio resources of each pool of the first plurality pools that are included within the pool of the second plurality of pools. Network node 120 communicates information about the first plurality of pools and second plurality of pools to wireless device 110.

In wireless network 100, each radio network node 120 may use any suitable radio access technology, such as long term evolution (LTE), LTE-Advanced, UMTS, HSPA, GSM, cdma2000, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 13A below. Similarly, a network node may include any suitable combination of hardware and/or software. For example, in particular embodiments, a network node, such as network node 120, may include the components described with respect to FIG. 14A below.

Figure 3:
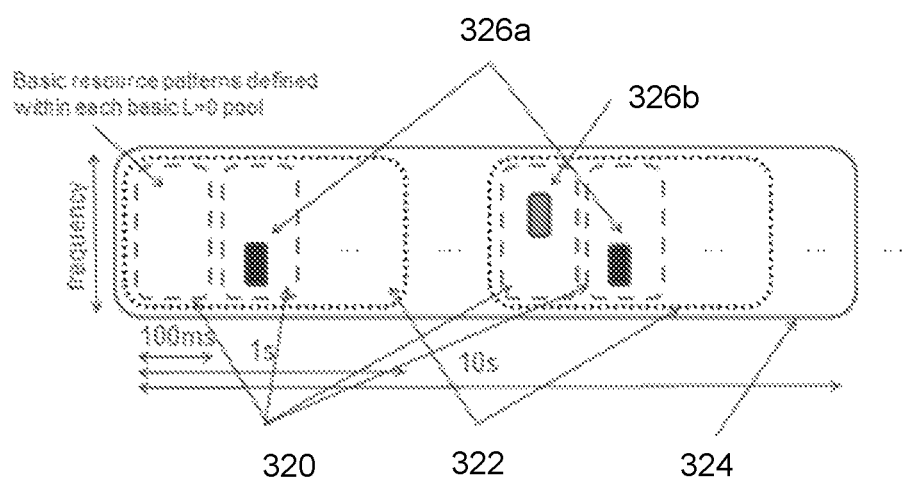
FIG. 3 is a block diagram illustrating an example of a nested resource pool configuration, according to a particular embodiment.

FIG. 3 is a block diagram illustrating an example of a nested resource pool configuration, according to a particular embodiment. The horizontal axis represents time and the vertical axis represents radio frequency. The time/frequency radio resources are divided into pools 320, 322, and 324.

Pool 320 comprises a plurality of radio resources 326 (e.g., time and frequency resources) for transmitting a radio signal. Pool 320 refers to a basic resource pool with the shortest periodicity. A pool may be associated with an aggregation level. For example, pool 320 may also be referred to as an aggregation level 0 pool or simply level 0 pool. In the illustrated example, the periodicity of pool 320 is 100 ms.

Radio resource 326 may refer to a single resource or group of resources. Radio resources 326 within a pool 320 may be grouped into one or more resource patterns. In particular embodiments, resource patterns may be designed to minimize the probability that pairs of wireless devices miss a transmission of the other device (e.g., due to half-duplex constraints, consistent interference, etc.). In particular embodiments, a pattern may be associated with a unique pattern index.

Pool 322 comprises a plurality, or aggregation, of pools 320. Pool 322 comprises a plurality of radio resources 326 for transmitting a radio signal. More specifically, pool 322 comprises the radio resources of each of its aggregated pools 320. In the illustrated example, the periodicity of pool 322 is 1 second. Pool 322 may also be referred to as an aggregation level 1 pool or simply level 1 pool.

Pool 324 comprises a plurality, or aggregation, of pools 322. Pool 324 comprises a plurality of radio resources 326 for transmitting a radio signal. More specifically, pool 324 comprises the radio resources of each of its aggregated pools 322, which in turn comprises the radio resources of each of its aggregated pools 320. In the illustrated example, the periodicity of pool 324 is 10 seconds. Pool 324 may also be referred to as an aggregation level 2 pool or simply level 2 pool.

FIG. 3 illustrates three levels of nested pools, each level with a particular periodicity. Other embodiments may include any suitable nesting level and any suitable periodicity for each level.

In particular embodiments, periodic transmissions may use resources from pools with corresponding periodicity. For example, radio resources 326a represent two radio resources of periodicity L=1 (i.e., 1 second in the illustrated example). Event-triggered transmissions may use the first suitable basic pool L=0 (e.g., radio resource 326b in the illustrated example).

Figure 4:
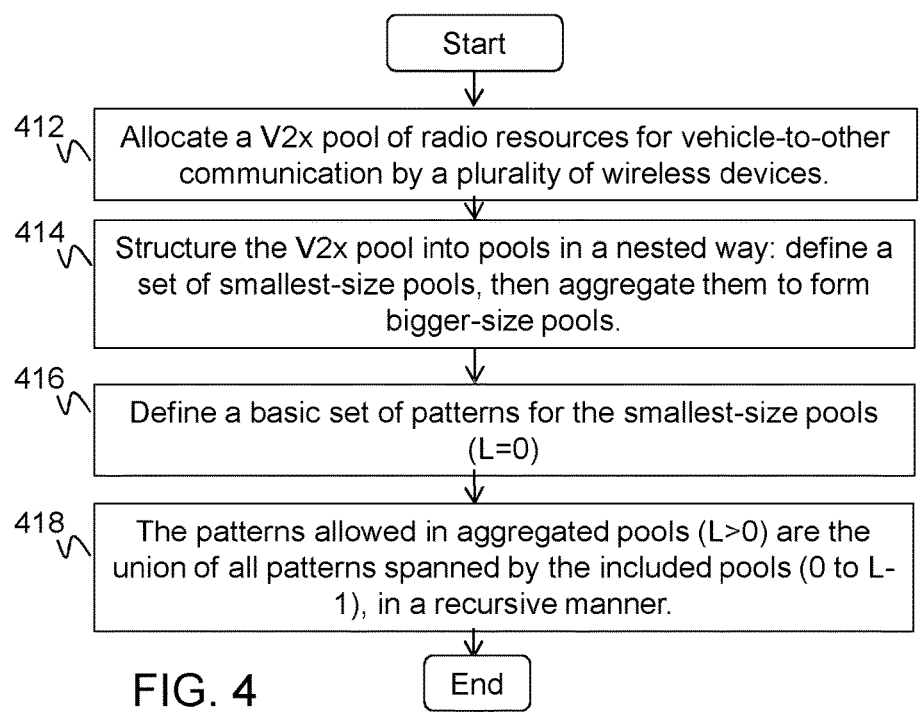
FIG. 4 is a flow diagram illustrating an example method of aggregating resource pools, according to particular embodiments.

FIG. 4 is a flow diagram illustrating an example method of aggregating resource pools, according to particular embodiments. In particular embodiments, one or more steps of FIG. 4 may be performed by a wireless device 110, network node 120, or any other suitable component of wireless network 100 described with respect to FIG. 2.

The method begins at step 412, where a pool of radio resources is allocated for communication between a plurality of wireless devices. For example, the pool of radio resources may comprise a V2x pool of radio resources for vehicle-to-other communications. Other embodiments may include any other suitable pool of radio resources for D2D communications.

At step 414, the pools are aggregated in multiple levels (i.e., nested). A basic or aggregation level 0 set of pools is determined. The basic pools are aggregated into larger pools, or pools with a longer periodicity. Particular embodiments may include any suitable level of aggregation and periodicity.

At step 416, a basic set of patterns is defined for each of the basic or aggregation level 0 pools. Each basic pool may comprise any suitable number and any suitable type of patterns.

Step 418 determines the patterns available for any aggregated pool (L>0) based on the union of all patterns spanned by its included pools (0 to L−1). For example, an aggregation level 1 pool includes all the patterns spanned by the aggregation level 0 pools included in the aggregation level 1 pool.

Modifications, additions, or omissions may be made to the method of FIG. 4. Additionally, one or more steps in the method of FIG. 4 may be performed in parallel or in any suitable order. In particular embodiments, the steps in the method of FIG. 4 may be performed by a network node, by a wireless device, by any other suitable network component, or any suitable combination of network components. In some embodiments, the results of the allocating and aggregating steps in the method of FIG. 4 may be predetermined, such as specified by a standard or other requirement.

As illustrated in FIGS. 3 and 4, radio resources may be divided into pools in a nested way. For example, FIG. 3 may represent a network in which messages with at least three periodicities are transmitted: 100 ms, 1 second, and 10 seconds. As described with respect to FIG. 4, the radio resources may be grouped into disjoint pools of 100 ms (which may be referred to as aggregation level L=0). The pools of 100 ms may be grouped into larger pools of 1 second (which may be referred to as aggregation level L=1). The pools of 1 second may be grouped into larger pools of 10 seconds (which may be referred to as aggregation level L=2). In this example, each group of 10 seconds includes 10 pools of 1 second, and each group of 1 second contains 10 pools of 100 ms. Other examples may include any suitable number of levels and periodicities. A basic set of patterns may be defined for the smallest pools with L=0. The patterns available in aggregated pools (L>0) comprise the union of all patterns spanned by the included pools. A particular advantage of aggregating pools is that patterns only need to be designed for L=0. Because the patterns in L>0 are identical to the ones used for L=0, all the radio properties of L=0 patterns are preserved for any L. Although the concept of "nested" design is useful to explain the embodiments described herein, the same result may be achieved without explicitly defining nested pools.

In particular embodiments, a wireless device, such as wireless device 110, may transmit a particular message by selecting a pattern from a pool, where the pool aggregation level L is a function of the periodicity of the message. The radio resource pools of various aggregation levels may be used for transmissions with different periodicities. For example, if a wireless device transmits packets with a periodicity of 1 second, then the wireless device may use the division of the resources in the 1 second pools. An example is illustrated in FIG. 5.

Figure 5:
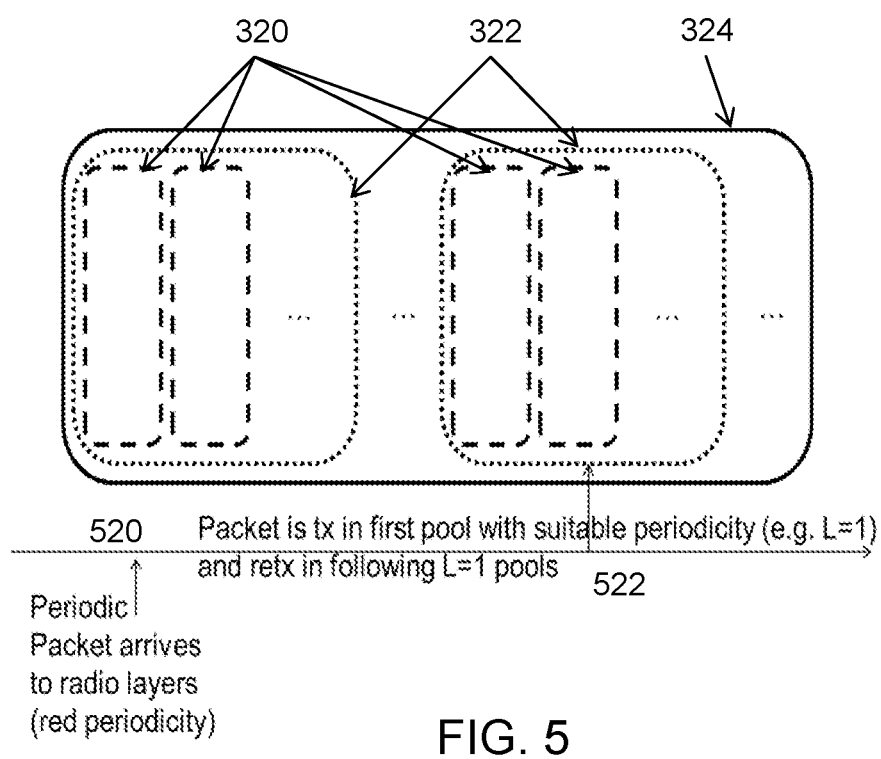
FIG. 5 is a block diagram illustrating an example of nested resource pools for transmission of periodic packets, according to particular embodiments.

FIG. 5 is a block diagram illustrating an example of nested resource pools for transmission of periodic packets, according to particular embodiments. Similar to FIG. 3, the horizontal axis represents time and the vertical axis represents radio frequency. The time/frequency radio resources are divided into nested pools 320, 322, and 324. Pool 320 comprises an aggregation level 0 (L=0) pool; pool 322 comprises an aggregation level 1 (L=1) pool; and pool 324 comprises an aggregation level 2 (L=2) pool.

At a time represented by arrow 520, a radio transmission layer of a wireless device, such as wireless device 110, receives a periodic packet to transmit. The periodicity may correspond to the periodicity of one of the aggregation levels.

In the illustrated example, the periodicity corresponds to aggregation level 1 (L=1). The wireless device may determine a resource in the first pool with a suitable periodicity (i.e., L=1) to transmit the packet. For example, the wireless device may determine a resource in an aggregation level 1 pool corresponding to a time represented by arrow 522. The wireless device may continue to transmit the periodic message according to the same pattern in subsequent L=1 pools. In particular embodiments, the wireless device may be configured to use resource pools of different lengths and/or periods.

In particular embodiments, the selected pool aggregation level L may depend on whether the message is periodic or aperiodic (e.g., event-triggered). An example with an aperiodic message is illustrated in FIG. 6.

Figure 6:
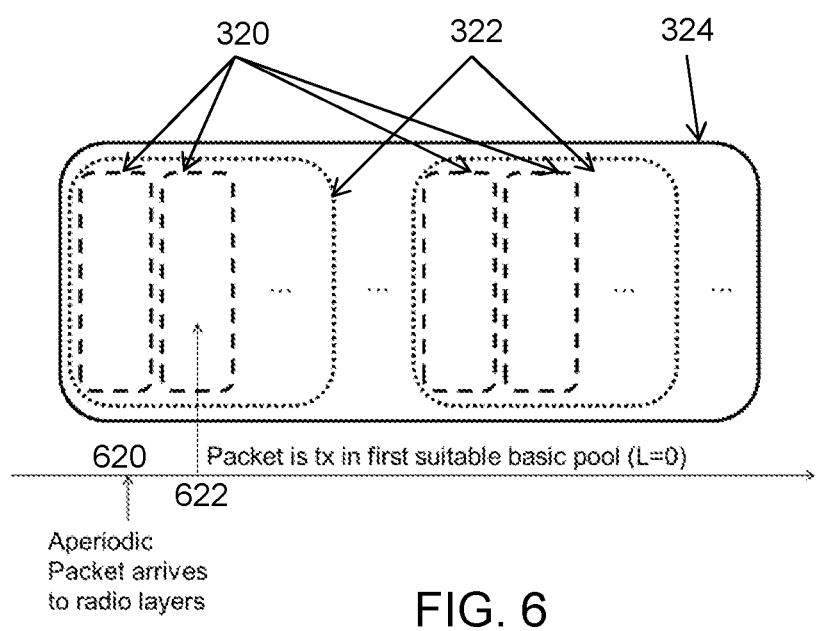
FIG. 6 is a block diagram illustrating an example of nested resource pools for transmission of aperiodic packets, according to particular embodiments.

FIG. 6 is a block diagram illustrating an example of nested resource pools for transmission of aperiodic packets, according to particular embodiments. Similar to FIGS. 3 and 5, the horizontal axis represents time and the vertical axis represents radio frequency. The time/frequency radio resources are divided into nested pools 320, 322, and 324. Pool 320 comprises an aggregation level 0 (L=0) pool; pool 322 comprises an aggregation level 1 (L=1) pool; and pool 324 comprises an aggregation level 2 (L=2) pool.

At a time represented by arrow 620, a radio transmission layer of a wireless device, such as wireless device 110, receives an aperiodic packet to transmit. In particular embodiments, the wireless device may transmit the aperiodic message using the first available pool of resources with small or smallest aggregation level (e.g., L=0). For example, the wireless device may determine a resource in the next available aggregation level 0 pool corresponding the time represented by arrow 622. The wireless device may transmit the aperiodic message using the determined resource.

Particular embodiments may include some delay between the time when the radio layer receives a message to be transmitted and the time when the message is actually transmitted. This may depend on processing time in the wireless device, signaling time, and time for sensing the radio environment and selecting an appropriate pattern within the first suitable pool. A particular advantage of these embodiments is reduced latency for aperiodic transmissions as compared to periodic transmissions that use predefined pool periodicities.

Figure 7:
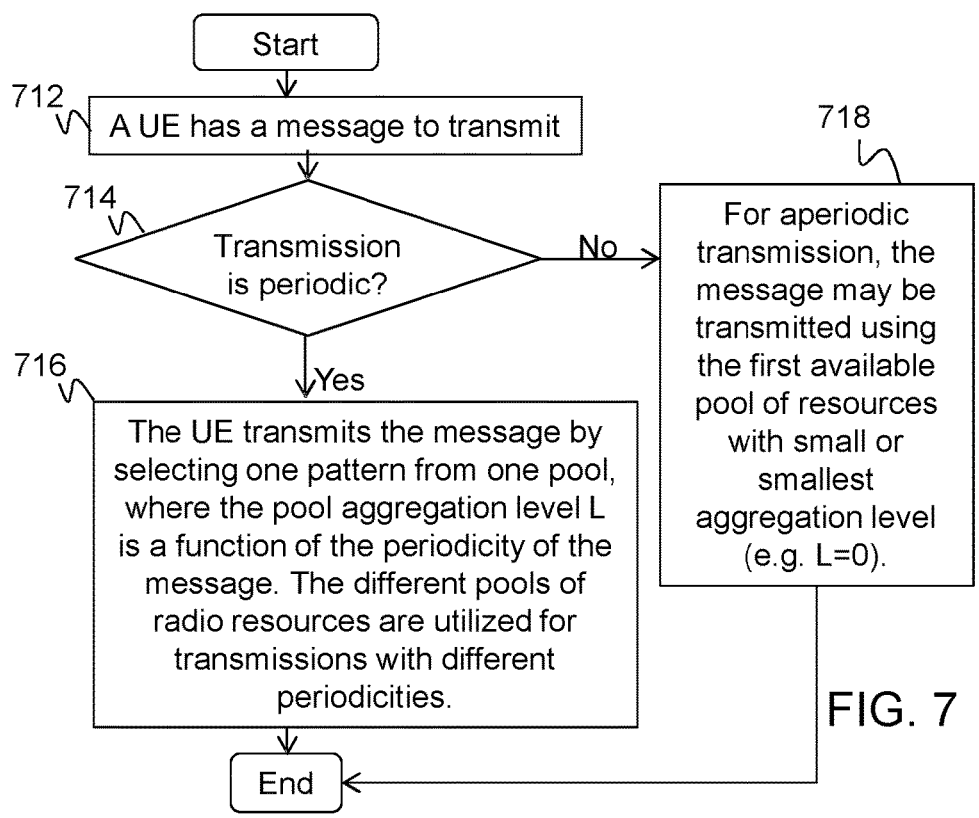
FIG. 7 is a flow diagram illustrating an example method of periodic and aperiodic transmissions, according to particular embodiments.

FIG. 7 is a flow diagram illustrating an example method of periodic and aperiodic transmissions, according to particular embodiments. The flow diagram is a generalization of the examples described with respect to FIGS. 5 and 6. In particular embodiments, one or more steps of FIG. 7 may be performed by wireless device 110 of wireless network 100 described with respect to FIG. 2.

The method begins at step 712, where a wireless device has a message to transmit. For example, a radio transmission layer of wireless device 110a may receive a message to transmit to wireless device 110b.

At step 714, the wireless device determines whether the message is a periodic or aperiodic message. If the message is periodic, the method continues to step 716.

At step 716, the wireless device transmits the message by selecting a pattern from a pool, where the pool aggregation level L is a function of the periodicity of the message. The different pools of radio resources may be used for transmissions with different periodicities.

For example, with respect to FIG. 3, the message may comprise a periodicity of 100 ms and wireless device 110a may select a pattern including resource 326a from pool 322. In other embodiments, the wireless device may receive signaling from another wireless device or a network node indicating which pattern to use from which pool.

Returning to step 714, if the message is aperiodic, the method continues to step 718. At step 718, the message may be transmitted using the first available pool of resources with small or smallest aggregation level (e.g., L=0). For example, with respect to FIG. 6, the radio transmission layer of wireless device 110a may receive the message to transmit at the time represented by arrow 620, and wireless device 110a may transmit using resources in the first available pool at the time represented by arrow 622.

Modifications, additions, or omissions may be made to the method of FIG. 7. Additionally, one or more steps in the method of FIG. 7 may be performed in parallel or in any suitable order.

In some embodiments, combining patterns within a pool may facilitate a flexible transmission format in terms of bandwidth and/or number of (re)transmissions within each pattern.

Figure 8:
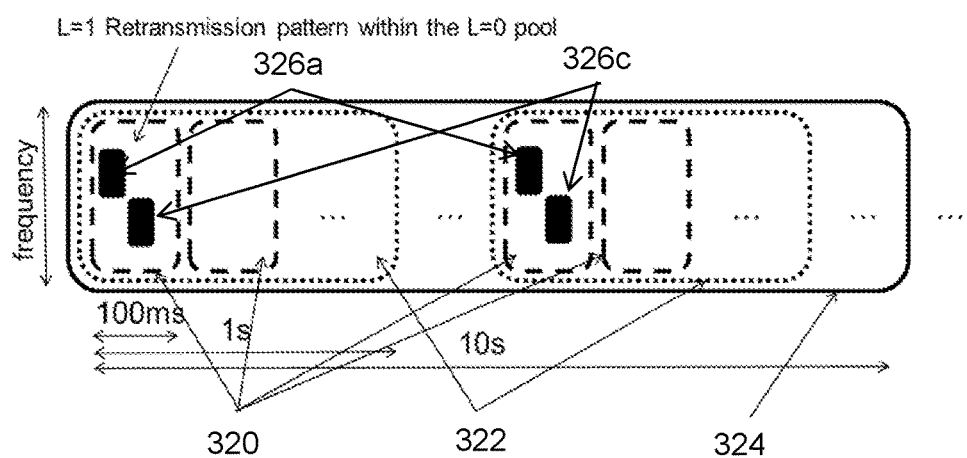
FIG. 8 is a block diagram illustrating an example of transmission repetition by extending or combining patterns within each basic resource pool, according to particular embodiments.

FIG. 8 is a block diagram illustrating an example of transmission repetition by extending or combining patterns within each basic resource pool, according to particular embodiments. The horizontal axis represents time and the vertical axis represents radio frequency. The time/frequency radio resources are divided into nested pools 320, 322, and 324. Pool 320 comprises an aggregation level 0 (L=0) pool; pool 322 comprises an aggregation level 1 (L=1) pool; and pool 324 comprises an aggregation level 2 (L=2) pool.

Radio resources 326a and 326c illustrate an example L=1 retransmission pattern within the L=0 pool. Radio resources 326c are selected within the same pool as radio resources 326a to provide retransmission capability if the transmission using radio resources 326a fails. In other embodiments, radio resources 326a and 326c may be combined to provide increased bandwidth. Although particular combinations of resources are illustrated, other embodiments may combine any suitable resources within a pool.

Figure 9:
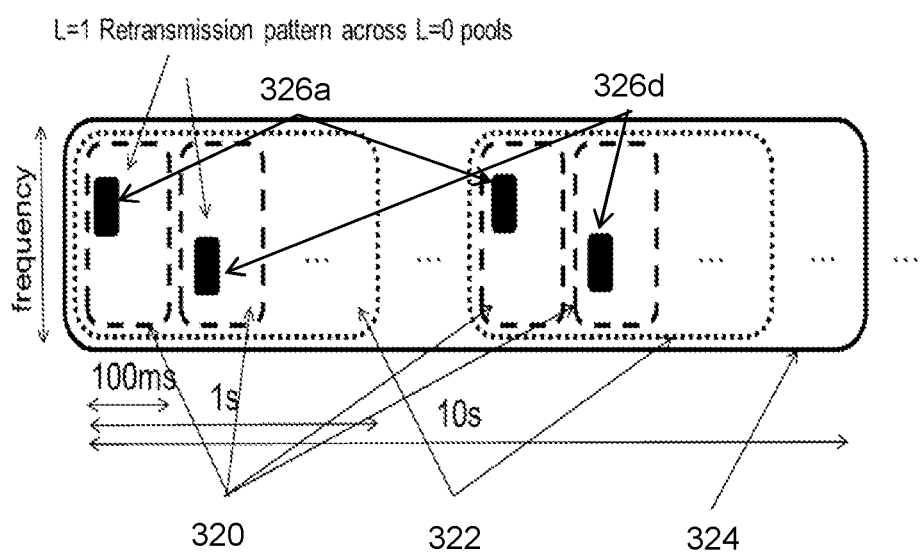
FIG. 9 is a block diagram illustrating an example of transmission repetition by extending or combining patterns across basic resource pools, according to particular embodiments.

FIG. 9 is a block diagram illustrating an example of transmission repetition by extending or combining patterns across basic resource pools, according to particular embodiments. The horizontal axis represents time and the vertical axis represents radio frequency. The time/frequency radio resources are divided into nested pools 320, 322, and 324. Pool 320 comprises an aggregation level 0 (L=0) pool; pool 322 comprises an aggregation level 1 (L=1) pool; and pool 324 comprises an aggregation level 2 (L=2) pool.

Radio resources 326a and 326d illustrate an example L=1 retransmission pattern across multiple L=0 pools. In case of retransmissions, the (re)transmission pattern may be obtained by combining multiple patterns within the same pool of level L but belonging to different pools of lower level than L. For example, a retransmission pattern of L=1 may be obtained by combining radio resources 326a from a first pool 320 and radio resources 326d from a second pool 320, both within the same pool 322. In other embodiments, radio resources 326a and 326d may be combined to provide increased bandwidth. Although particular combinations of resources are illustrated, other embodiments may combine any suitable resources across pools of the same level.

In particular embodiments, the resources spanned by a given pattern may vary across pool repetitions according to a pre-defined hopping pattern. The hopping pattern may be a function of various parameters. The randomization may consist of re-indexing of the patterns and/or various time/frequency shifts, possibly performed in a circular way within the pool. One objective is to avoid consistent interference/blocking between given patterns across pool repetitions.

In particular embodiments, a wireless device indicates by any form of implicit or explicit signaling the pool and/or pool aggregation level that it is using and/or the pool and/or pool aggregation level that it intends to use for future transmissions. In some embodiments, this enables other wireless devices to optimize their resource allocation and reduce interference at future allocations. A wireless device may even indicate the lower aggregation level pool that the pattern belongs to. In other words, patterns enable wireless devices to predict the utilization of radio resources into the future. For example, wireless devices may combine the knowledge of the patterns with information about the past/present usage of the radio resources to determine whether they will be available in the near future or not. In particular embodiments, this information may be used as input to the resource allocation process itself or to select a new pattern.

By doing so, the resources that are not used by wireless devices transmitting with higher periodicities may be used by, for example, other wireless devices for aperiodic transmissions.

Figure 10:
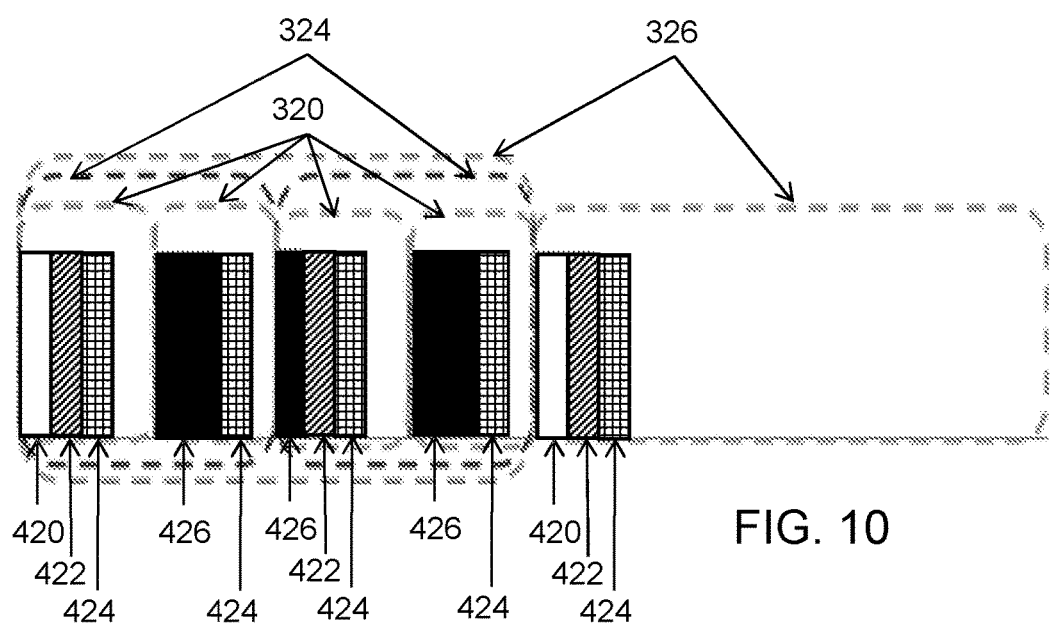
FIG. 10 is a block diagram illustrating an example of transmissions with various periodicities, according to a particular embodiment.

FIG. 10 is a block diagram illustrating an example of transmissions with various periodicities, according to a particular embodiment. The horizontal axis represents time and the vertical axis represents radio frequency. The time/frequency radio resources are divided into nested pools 320, 322, and 324. Pool 320 comprises an aggregation level 0 (L=0) pool; pool 322 comprises an aggregation level 1 (L=1) pool; and pool 324 comprises an aggregation level 2 (L=2) pool. The pools include radio resources 420, 422, 424, and 426.

In the illustrated example, radio resources 420 have a periodicity corresponding to pools 326, radio resources 422 have a periodicity corresponding to pools 324, and radio resources 424 have a periodicity corresponding to pools 320. Radio resources 426 remain unused and can be used for aperiodic transmissions.

Particular embodiments include advantages over conventional pools. For example, a conventional pool allocation may correspond to one aggregation level, such as L=0. With a single aggregation level of L=0, a wireless device transmitting a period transmission needs to track how to increment the hopping pattern many L0 pools later. This approach may be complex for the wireless device. As another example, a conventional pool allocation method may use only L=1 pools. In this approach, a wireless device may experience a delay before it can transmit, for example, an aperiodic transmission.

Using nested or aggregated pools, when a wireless device transmits a periodic transmission, the wireless device need only track the L1 pool and increment the hopping pattern from one resource pool to the next. It may be easier to indicate which resource pool to use in such an approach. Using nested or aggregated pools also enables a wireless device with an aperiodic transmission to quickly find a resource pool to use, thus reducing delay.

Figure 11:
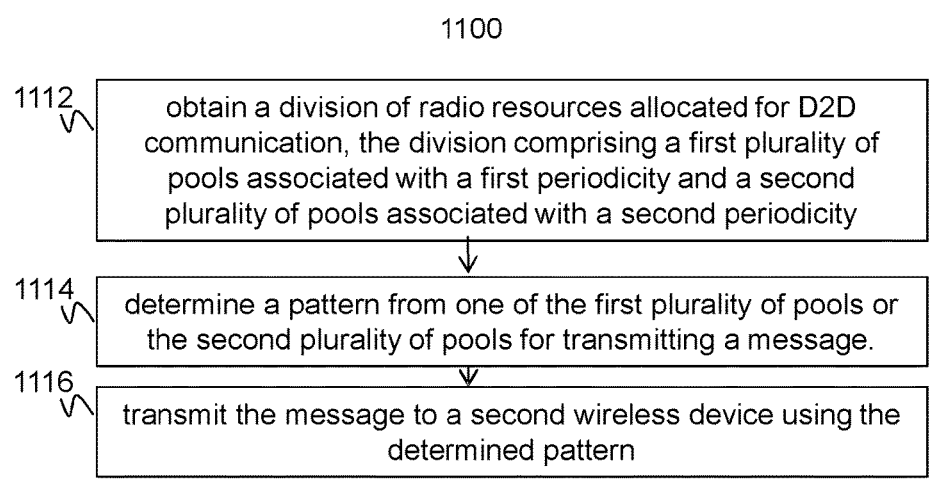
FIG. 11 is a flow diagram illustrating an example method in a wireless device of device-to-device communication, according to particular embodiments.

FIG. 11 is a flow diagram illustrating an example method in a wireless device of device-to-device communication, according to particular embodiments. In particular embodiments, one or more steps of FIG. 11 may be performed by wireless device 110 of wireless network 100 described with respect to FIG. 2.

The method begins at step 1112, where a wireless device obtains a division of radio resources allocated for D2D communication, the division comprising a first plurality of pools associated with a first periodicity and a second plurality of pools associated with a second periodicity. For example, wireless device 110a may obtain a division of its radio resources allocated for D2D communication according to any of the examples discussed above with respect to FIGS. 2-10. For example, in some embodiments the first plurality of pools may include any of the L=0 pools described herein and the second plurality of pools may include any of the L=1 or L=2 pools described herein.

In particular embodiments, the division may be predetermined or preconfigured. In some embodiments the division may be received from a network node, such as network node 120. Some embodiments may obtain the division based on any suitable combination of preconfiguration, predetermination, and/or signaling.

In particular embodiments, each pool of the first plurality of pools comprises the same plurality of patterns. In some embodiments, a set of resources spanned by a pattern of the plurality of patterns varies across pools of the first plurality of pools according to a hopping pattern.

At step 1114, the wireless device determines a pattern from one of the first plurality of pools or the second plurality of pools for transmitting a message. For example, with respect to the example illustrated in FIG. 3, wireless device 110a may determine a pattern from pool 320 or a pattern from pool 322 for transmitting a message.

In particular embodiments, the wireless device may select the pattern from one of the first or second plurality of pools. In some embodiments, the determination of the pattern may be signaled to the wireless device from another component of network 100, such as network node 120.

As described with respect to FIG. 7, in some embodiments the wireless device may determine the pattern based on a periodicity of the message. For example, with respect to the example illustrated in FIG. 3, for a message with a periodicity of 1 second, wireless device 110a may determine a pattern from pool 322, which also has a periodicity of 1 second. For an aperiodic message, wireless device 110a may determine a pattern from pool 320.

In particular embodiments, the wireless device may determine a retransmission pattern for retransmission of the message should the original transmission fail. In particular embodiments the determined retransmission pattern is from the same plurality of pools as the determined pattern, such as described with respect to FIG. 9. In some embodiments, the determined retransmission pattern is from the same pool as the determined pattern, such as described with respect to FIG. 8.

At step 1116, the wireless device transmits the message to a second wireless device using the determined pattern. For example, wireless device 110*a* may transmit the message to wireless device 110*b* using the determined pattern.

In particular embodiments, the message may comprise a vehicular communication message. In some embodiments, the message may comprise any suitable D2D message.

Modifications, additions, or omissions may be made to the method of FIG. 11. Additionally, one or more steps in the method of FIG. 11 may be performed in parallel or in any suitable order.

Figure 12:
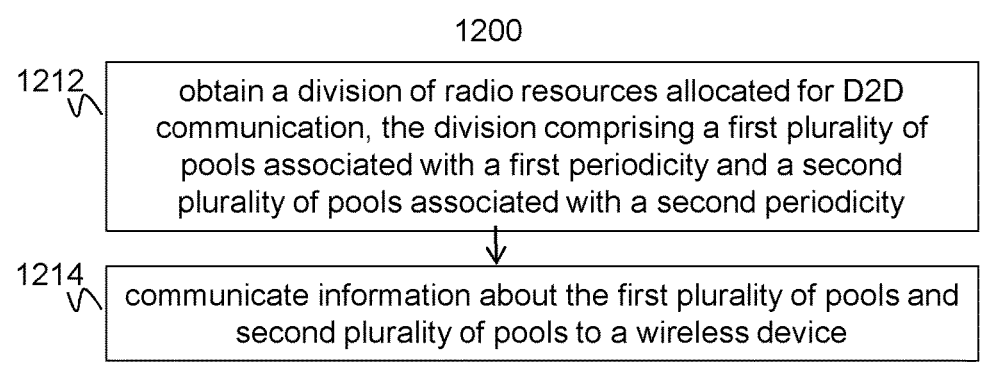
FIG. 12 is a flow diagram illustrating an example method in a network node of device-to-device communication, according to particular embodiments

FIG. 12 is a flow diagram illustrating an example method in a network node of device-to-device communication, according to particular embodiments. In particular embodiments, one or more steps of FIG. 12 may be performed by network node 120 of wireless network 100 described with respect to FIG. 2.

The method begins at step 1212, where a network node obtains a division of radio resources allocated for D2D communication, the division comprising a first plurality of pools associated with a first periodicity and a second plurality of pools associated with a second periodicity. For example, network node 120*a* may obtain a division of its radio resources allocated for D2D communication according to any of the examples discussed above with respect to FIGS. 2-11.

In particular embodiments, the division may be predetermined or preconfigured. In some embodiments the division may be determined dynamically based on network conditions or network traffic. Some embodiments may obtain the division based on any suitable combination of preconfiguration, predetermination, and/or dynamic determination.

At step 1214, the network node communicates information about the first plurality of pools and second plurality of pools to a wireless device. For example, network node 120*a* may communicate information about pools 320, 322 and 324 to wireless device 110*a*.

Modifications, additions, or omissions may be made to the method of FIG. 12. Additionally, one or more steps in the method of FIG. 12 may be performed in parallel or in any suitable order.

FIG. 13A is a block diagram illustrating an example embodiment of a wireless device. The wireless device is an example of the wireless devices 110 illustrated in FIG. 2. The wireless device is capable of obtaining a division of radio resources. The division of radio resources comprises a first plurality of pools of a first periodicity. Each of the first plurality of pools comprises a set of radio resources and a plurality of patterns spanning the set of radio resources. The division of radio resources also comprises a division of the first plurality of pools into a second plurality of pools of a second periodicity greater than the first periodicity. Each of the second plurality of pools comprises a plurality of patterns comprising a union of the plurality of patterns of each pool of the first plurality pools that are included within the pool of the second plurality of pools. The wireless device is further capable of determining a pattern from one of the first or second plurality of pools, and transmitting a message to another wireless device using the determined pattern.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 1310, processor 1320, and memory 1330. In some embodiments, transceiver 1310 facilitates transmitting wireless signals to and receiving wireless signals from wireless network node 120 (e.g., via an antenna), processor 1320 executes instructions to provide some or all of the functionality described herein as provided by the wireless device, and memory 1330 stores the instructions executed by processor 1320.

Processor 1320 includes any suitable combination of hardware and software implemented in one or more integrated circuits or modules to execute instructions and manipulate data to perform some or all of the described functions of the wireless device. In some embodiments, processor 1320 may include, for example, one or more computers, one more programmable logic devices, one or more central processing units (CPUs), one or more microprocessors, one or more applications, and/or other logic, and/or any suitable combination of the preceding. Processor 1320 may include analog and/or digital circuitry configured to perform some or all of the described functions of wireless device 110. For example, processor 1320 may include resistors, capacitors, inductors, transistors, diodes, and/or any other suitable circuit components.

Memory 1330 is generally operable to store computer executable code and data. Examples of memory 1330 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

In particular embodiments, processor 1320 in communication with transceiver 1310 obtain a division of radio resources comprising aggregated or nested pools of radio resources. A plurality of patterns span the pools of radio resources. Processor 1320 in communication with transceiver 1310 determines a pattern from one of the aggregated or nested pools of radio resources, and uses it to transmit the message.

Other embodiments of the wireless device may include additional components (beyond those shown in FIG. 13A) responsible for providing certain aspects of the wireless device's functionality, including any of the functionality described above and/or any additional functionality (including any functionality necessary to support the solution described above).

FIG. 13B is a block diagram illustrating example components of a wireless device 110. The components may include obtaining module 1350, pattern determining module 1352, and transmitting module 1354.

Obtaining module 1350 may perform the obtaining functions of wireless device 110. For example, obtaining module 1350 may obtain a division of radio resources allocated for D2D communication. The division of the radio resources may comprise a first plurality of pools associated with a first periodicity and a second aggregated or nested plurality of pools associated with a second periodicity. In certain embodiments, obtaining module 1350 may include or be included in processor 1320. In particular embodiments, obtaining module 1350 may communicate with pattern determining module 1352, and transmitting module 1354.

Pattern determining module 1352 may perform the pattern determining functions of wireless device 110. For example, pattern determining module 1352 may determine a pattern from one of the nested or aggregated pools for transmitting a message. In certain embodiments, pattern determining module 1352 may include or be included in processor 1320.

In particular embodiments, pattern determining module 1352 may communicate with obtaining module 1350 and transmitting module 1354.

Transmitting module 1354 may perform the transmitting functions of wireless device 110. For example, transmitting module 1354 may transmit messages to another wireless device 110. In certain embodiments, transmitting module 1354 may include or be included in processor 1320. Transmitting module 1354 may include circuitry configured to transmit radio signals. In particular embodiments, transmitting module 1354 may communicate with obtaining module 1350 and pattern determining module 1352.

FIG. 14A is a block diagram illustrating an example embodiment of a network node. The network node is an example of the network node 120 illustrated in FIG. 2. The network node is capable of obtaining a division of radio resources. The division of radio resources comprises a first plurality of pools of a first periodicity. Each of the first plurality of pools comprises a set of radio resources and a plurality of patterns spanning the set of radio resources. The division of radio resources also comprises a division of the first plurality of pools into a second plurality of pools of a second periodicity greater than the first periodicity. Each of the second plurality of pools comprises a plurality of patterns comprising a union of the plurality of patterns of each pool of the first plurality pools that are included within the pool of the second plurality of pools. The network node is capable of communicating information about the first and second plurality of pools to a wireless device.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. Network node 120 includes at least one transceiver 1410, at least one processor 1420, at least one memory 1430, and at least one network interface 1440. Transceiver 1410 facilitates transmitting wireless signals to and receiving wireless signals from a wireless device, such as wireless devices 110 (e.g., via an antenna); processor 1420 executes instructions to provide some or all of the functionality described above as being provided by a network node 120; memory 1430 stores the instructions executed by processor 1420; and network interface 1440 communicates signals to backend network components, such as a gateway, switch, router, Internet, Public Switched Telephone Network (PSTN), controller, and/or other network nodes 120. Processor 1420 and memory 1430 can be of the same types as described with respect to processor 1320 and memory 1330 of FIG. 13A above.

In some embodiments, network interface 1440 is communicatively coupled to processor 1420 and refers to any suitable device operable to receive input for network node 120, send output from network node 120, perform suitable processing of the input or output or both, communicate to other devices, or any combination of the preceding. Network interface 1440 includes appropriate hardware (e.g., port, modem, network interface card, etc.) and software, including protocol conversion and data processing capabilities, to communicate through a network.

In particular embodiments, processor 1420 in communication with transceiver 1410 obtain a division of radio resources comprising aggregated or nested pools of radio resources. Processor 1420 in communication with transceiver 1410 communicates information about the aggregated or nested pools to a wireless device.

Other embodiments of network node 120 include additional components (beyond those shown in FIG. 14A) responsible for providing certain aspects of the network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

FIG. 14B is a block diagram illustrating example components of a network node 120. The components may include obtaining module 1450 and communicating module 1452.

Obtaining module 1450 may perform the obtaining functions of network node 120. For example, obtaining module 1450 may obtain a division of radio resources allocated for D2D communication. The division of the radio resources may comprise a first plurality of pools associated with a first periodicity and a second aggregated or nested plurality of pools associated with a second periodicity. In certain embodiments, obtaining module 1450 may include or be included in processor 1420. In particular embodiments, obtaining module 1450 may communicate with communicating module 1452.

Communicating module 1452 may perform the communicating functions of network node 120. For example, communicating module 1452 may transmit messages to wireless device 110. In certain embodiments, communicating module 1452 may include or be included in processor 1420. Communicating module 1452 may include circuitry configured to transmit radio signals. In particular embodiments, communicating module 1452 may communicate with obtaining module 1450.

Figure 15:
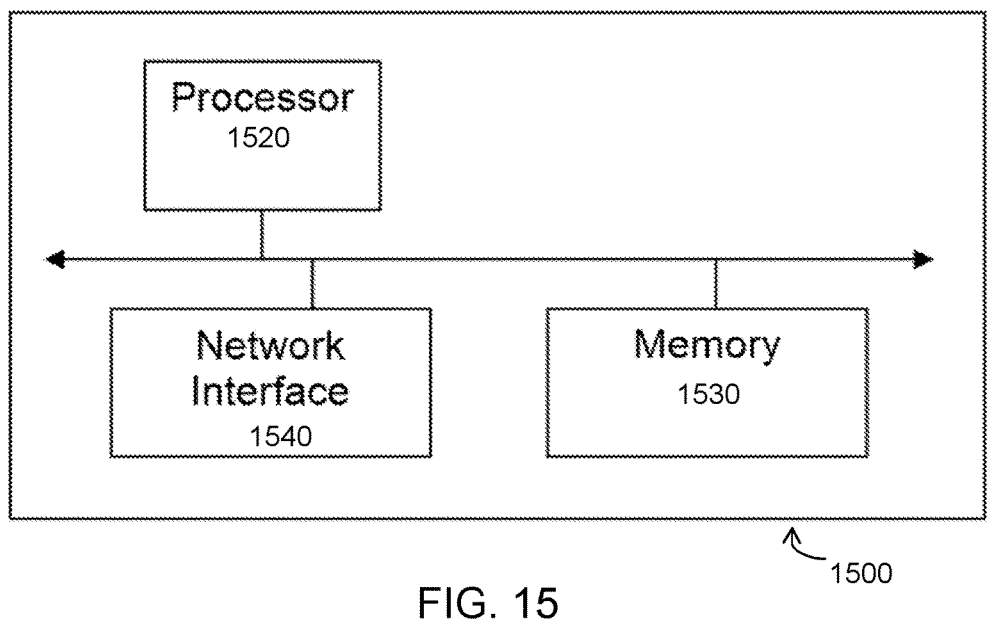
FIG. 15 is a block diagram illustrating an example embodiment of a radio network controller or core network node.

FIG. 15 is a block diagram illustrating an example embodiment of a radio network controller or core network node. Examples of network nodes can include a mobile switching center (MSC), a serving GPRS support node (SGSN), a mobility management entity (MME), a radio network controller (RNC), a base station controller (BSC), and so on.

Radio network controller or core network node 1500 is capable of obtaining a division of radio resources. The division of radio resources comprises a first plurality of pools of a first periodicity. Each of the first plurality of pools comprises a set of radio resources and a plurality of patterns spanning the set of radio resources. The division of radio resources also comprises a division of the first plurality of pools into a second plurality of pools of a second periodicity greater than the first periodicity. Each of the second plurality of pools comprises a plurality of patterns comprising a union of the plurality of patterns of each pool of the first plurality pools that are included within the pool of the second plurality of pools. Radio network controller or core network node 1500 is capable of communicating information about the first and second plurality of pools to a wireless device, such as wireless device 110, or a network node, such as network node 120.

The radio network controller or core network node 1500 include processor 1520, memory 1530, and network interface 1540. In some embodiments, processor 1520 executes instructions to provide some or all of the functionality described above as being provided by the network node, memory 1530 stores the instructions executed by processor 1520, and network interface 1540 communicates signals to any suitable node, such as a gateway, switch, router, Internet, Public Switched Telephone Network (PSTN), network nodes 120, radio network controllers or core network nodes 1500, etc.

Processor 1520 may include any suitable combination of hardware and software implemented in one or more modules to execute instructions and manipulate data to perform some or all of the described functions of the radio network controller or core network node 1500. In some embodiments, processor 1520 may include, for example, one or more computers, one or more central processing units (CPUs), one or more microprocessors, one or more applications, and/or other logic.

Memory 1530 is generally operable to store instructions, such as a computer program, software, an application including one or more of logic, rules, algorithms, code, tables, etc. and/or other instructions capable of being executed by a processor. Examples of memory 1530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1540 is communicatively coupled to processor 1520 and may refer to any suitable device operable to receive input for the network node, send output from the network node, perform suitable processing of the input or output or both, communicate to other devices, or any combination of the preceding. Network interface 1540 may include appropriate hardware (e.g., port, modem, network interface card, etc.) and software, including protocol conversion and data processing capabilities, to communicate through a network.

Other embodiments of the network node may include additional components beyond those shown in FIG. 15 that may be responsible for providing certain aspects of the network node's functionality, including any of the functionality described above and/or any additional functionality (including any functionality necessary to support the solution described above).

Some embodiments of the disclosure may provide one or more technical advantages. As an example, in some embodiments nested or aggregated resource pools are spectrally more efficient than resource pools dedicated to particular transmission formats or periodicities. Particular embodiments provide simplicity from a signaling and implementation perspective, which may reduce device maintenance and development costs. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP Third Generation Partnership Project
BSM Basic Safety Message
BSR Buffer Status Report
BTS Base Transceiver Station
CAM Co-operative Awareness Message
D2D Device to Device
DENM Decentralized Environmental Notification Message
DRX Discontinuous Reception
DSRC Dedicated Short-Range Communications
eNB eNodeB
ETSI European Telecommunications Standards Institute
LTE Long Term Evolution
M2M Machine to Machine
MIMO Multi-Input Multi-Output
MTC Machine Type Communication
ProSe Proximity Services
PSCCH Physical Sidelink Control Channel
PSDCH Physical Sidelink Discovery Channel
PSSCH Physical Sidelink Shared Channel
PTT Push-To-Talk
RAN Radio Access Network
RAT Radio Access Technology
RRH Remote Radio Head
RRU Remote Radio Unit
UE User Equipment
V2I Vehicle-to-Infrastructure
V2P Vehicle-to-Person
V2V Vehicle-to-Vehicle
V2x Vehicle-to-any
WAN Wireless Access Network

The invention claimed is:

1. A method of device-to-device (D2D) communication in a wireless communication network, the D2D communication being vehicle-to-any communication, the method comprising:
obtaining, by a first wireless device, a division of radio resources allocated for the D2D communication, the division of the radio resources comprising:
a first plurality of pools associated with a first periodicity corresponding to a first aggregation level, each pool of the first plurality of pools comprising:
a set of radio resources, the set of radio resources comprising a subset of the radio resources allocated for the D2D communication;
a plurality of patterns spanning the set of radio resources; and
a division of the first plurality of pools into a second plurality of pools associated with a second periodicity greater than the first periodicity, wherein the second periodicity corresponds to a second aggregation level greater than the first aggregation level, and wherein each pool, of the first plurality of pools associated with the first aggregation level, is comprised in the second plurality of pools associated with the second aggregation level, each pool of the second plurality of pools comprising a plurality of patterns comprising a union of the plurality of patterns spanning the radio resources of each pool of the first plurality pools;
determining a pattern from one of the first plurality of pools or the second plurality of pools for transmitting a message; and
transmitting the message to a second wireless device using the determined pattern.

2. The method of claim 1, wherein:
the message is periodic; and
determining the pattern for transmitting the message comprises determining a pattern based on a periodicity of the message and at least one of the first periodicity associated with the first plurality of pools and the second periodicity associated with the second plurality of pools.

3. The method of claim 1, wherein:
the message is aperiodic; and
determining the pattern for transmitting the message comprises determining a pattern from a pool of the first plurality of pools.

4. The method of claim 1, further comprising determining a retransmission pattern for retransmission of the message, wherein the determined retransmission pattern is obtained from the same plurality of pools as the determined pattern.

5. The method of claim 1, further comprising determining a retransmission pattern for retransmission of the message, wherein the determined retransmission pattern is obtained from the same pool as the determined pattern.

6. The method of claim 1, further comprising signaling, to the second wireless device, information about a pool to which the determined pattern belongs.

7. The method of claim 1, wherein the plurality of patterns of a pool of the first plurality of pools comprise identical lengths and a number of radio resources.

8. The method of claim 1, wherein obtaining the division of radio resources allocated for the D2D communication comprises receiving the division from a network node.

9. The method of claim 1, wherein obtaining the division of radio resources allocated for the D2D communication comprises the first wireless device being preconfigured with the division.

10. The method of claim 1, wherein the message comprises a vehicular communication message.

11. The method of claim 1, wherein each pool of the first plurality of pools comprises the same plurality of patterns.

12. The method of claim 1, wherein the set of resources spanned by a pattern of the plurality of patterns varies across pools of the first plurality of pools according to a hopping pattern.

13. A method of device-to-device (D2D) communication in a wireless communication network, the D2D communication being vehicle-to-any communication, the method comprising:
obtaining, by a network node, a division of radio resources allocated for the D2D communication, the division of the radio resources comprising:
a first plurality of pools associated with a first periodicity corresponding to a first aggregation level, each pool of the first plurality of pools comprising:
a set of radio resources, the set of radio resources comprising a subset of the radio resources allocated for the D2D communication;
a plurality of patterns spanning the set of radio resources; and
a division of the first plurality of pools into a second plurality of pools associated with a second periodicity greater than the first periodicity, wherein the second periodicity corresponds to a second aggregation level greater than the first aggregation level, and wherein each pool, of the first plurality of pools associated with the first aggregation level, is comprised in the second plurality of pools associated with the second aggregation level, each pool of the second plurality of pools comprising a plurality of patterns comprising a union of the plurality of patterns spanning the radio resources of each pool of the first plurality pools; and
communicating information about the first plurality of pools and the second plurality of pools to a wireless device.

14. The method of claim 13, wherein the plurality of patterns of a pool of the first plurality of pools comprise identical lengths and a number of radio resources.

15. The method of claim 13, wherein the set of resources spanned by a pattern of the plurality of patterns varies across pools of the first plurality of pools according to a hopping pattern.

16. A wireless device for device to device (D2D) communication in a wireless communication network, the D2D communication being vehicle-to-any communication, the wireless device comprising a memory coupled to a processor, the processor configured to:
obtain a division of radio resources allocated for the D2D communication, the division of the radio resources comprising:
a first plurality of pools associated with a first periodicity corresponding to a first aggregation level, each pool of the first plurality of pools comprising:
a set of radio resources, the set of radio resources comprising a subset of the radio resources allocated for the D2D communication;
a plurality of patterns spanning the set of radio resources; and
a division of the first plurality of pools into a second plurality of pools associated with a second periodicity greater than the first periodicity, wherein the second periodicity corresponds to a second aggregation level greater than the first aggregation level, and wherein each pool, of the first plurality of pools associated with the first aggregation level, is comprised in the second plurality of pools associated with the second aggregation level, each pool of the second plurality of pools comprising a plurality of patterns comprising a union of the plurality of patterns spanning the radio resources of each pool of the first plurality pools;
determine a pattern from one of the first plurality of pools or the second plurality of pools for transmitting a message; and
transmit the message to another wireless device using the determined pattern.

17. The wireless device of claim 16, wherein:
the message is periodic; and
the processor is configured to determine a pattern for transmitting the message based on a periodicity of the message and at least one of the first periodicity associated with the first plurality of pools and the second periodicity associated with the second plurality of pools.

18. The wireless device of claim 16, wherein:
the message is aperiodic; and
the processor is configured to determine a pattern for transmitting the message from a pool of the first plurality of pools.

19. The wireless device of claim 16, the processor further configured to determine a retransmission pattern for retransmission of the message, wherein the determined retransmission pattern is obtained from the same plurality of pools as the determined pattern.

20. The wireless device of claim 16, the processor further configured to determine a retransmission pattern for retransmission of the message, wherein the determined retransmission pattern is obtained from the same pool as the determined pattern.

21. The wireless device of claim 16, the processor further configured to signal, to another wireless device, information about a pool to which the determined pattern belongs.

22. The wireless device of claim 16, wherein the plurality of patterns of a pool of the first plurality of pools comprise identical lengths and a number of radio resources.

23. The wireless device of claim 16, wherein the processor is configured to receive the division of radio resources allocated for the D2D communication from a network node.

24. The wireless device of claim 16, wherein the processor is configured to obtain the division of radio resources allocated for the D2D communication from a preconfiguration of the wireless device.

25. The wireless device of claim 16, wherein the message comprises a vehicular communication message.

26. The wireless device of claim 16, wherein each pool of the first plurality of pools comprises the same plurality of patterns.

27. The wireless device of claim 16, wherein the set of resources spanned by a pattern of the plurality of patterns varies across pools of the first plurality of pools according to a hopping pattern.

28. A network node for device to device (D2D) communication in a wireless communication network, the D2D communication being vehicle-to-any communication, the network node comprising a memory coupled to a processor, the processor configured to:

obtain a division of radio resources allocated for the D2D communication, the division of the radio resources comprising:
   a first plurality of pools associated with a first periodicity corresponding to a first aggregation level, each pool of the first plurality of pools comprising:
      a set of radio resources, the set of radio resources comprising a subset of the radio resources allocated for the D2D communication;
      a plurality of patterns spanning the set of radio resources; and
      a division of the first plurality of pools into a second plurality of pools associated with a second periodicity greater than the first periodicity, wherein the second periodicity corresponds to a second aggregation level greater than the first aggregation level, and wherein each pool, of the first plurality of pools associated with the first aggregation level, is comprised in the second plurality of pools associated with the second aggregation level, each pool of the second plurality of pools comprising a plurality of patterns comprising a union of the plurality of patterns spanning the radio resources of each pool of the first plurality pools; and
communicate information about the first plurality of pools and the second plurality of pools to a wireless device.

29. The network node of claim 28, wherein the plurality of patterns of a pool of the first plurality of pools comprise identical lengths and a number of radio resources.

30. The network node of claim 28, wherein the set of resources spanned by a pattern of the plurality of patterns varies across pools of the first plurality of pools according to a hopping pattern.

* * * * *